US012203314B2

(12) United States Patent
Weißer et al.

(10) Patent No.: US 12,203,314 B2
(45) Date of Patent: Jan. 21, 2025

(54) SPINDLE DRIVE FOR THE MOTOR ADJUSTMENT OF AN ADJUSTMENT ELEMENT OF A MOTOR VEHICLE

(71) Applicants: Brose Fahrzeugteile SE & Co. Kommanditgesellschaft, Bamberg, Bamberg (DE); IMS GEAR SE & CO. KGAA, Donaueschingen (DE)

(72) Inventors: Axel Weißer, Dunningen (DE); Egor Melnikov, Wurmlingen (DE); Matthias Kieninger, VS-Villingen (DE); Philipp Leuerer, Hofheim (DE); Harald Krüger, Bamberg (DE)

(73) Assignee: Brose Fahrzeugteile SE & Co. Kommanditgesellschaft, Bamberg (DE)

( * ) Notice: Subject to any disclaimer, the term of this patent is extended or adjusted under 35 U.S.C. 154(b) by 227 days.

(21) Appl. No.: 17/430,868

(22) PCT Filed: Feb. 13, 2020

(86) PCT No.: PCT/EP2020/053695
§ 371 (c)(1),
(2) Date: Aug. 13, 2021

(87) PCT Pub. No.: WO2020/165309
PCT Pub. Date: Aug. 20, 2020

(65) Prior Publication Data

US 2022/0136310 A1 May 5, 2022

(30) Foreign Application Priority Data

Feb. 13, 2019 (DE) ..................... 10 2019 103 682.8

(51) Int. Cl.
*E05F 15/622* (2015.01)

(52) U.S. Cl.
CPC ......... *E05F 15/622* (2015.01); *E05Y 2201/21* (2013.01); *E05Y 2201/26* (2013.01); *E05Y 2201/72* (2013.01); *E05Y 2900/546* (2013.01)

(58) Field of Classification Search
CPC ........... E05Y 2900/546; E05Y 2201/72; E05Y 2201/26; E05Y 2201/21; E05F 15/622
See application file for complete search history.

(56) References Cited

U.S. PATENT DOCUMENTS 5,873,622 A * 2/1999 Kluting ............... E05D 11/1007 16/337
11,015,378 B2 5/2021 Fees et al.
2013/0269305 A1 * 10/2013 Wang ...................... F16H 25/20 56/14.7

FOREIGN PATENT DOCUMENTS

DE 202006014694 U1 2/2008
DE 102007043372 A1 4/2008
(Continued)

OTHER PUBLICATIONS

Machine translation of WO 2013045104 (Year: 2013).*
(Continued)

*Primary Examiner* — Randell J Krug
(74) *Attorney, Agent, or Firm* — Dickinson Wright PLLC

(57) ABSTRACT

A spindle drive for the motor-driven adjustment of an adjustable element including a housing, a body connector, an adjustable element connector, a spindle nut, a spindle disposed in the housing and operatively connected to the spindle nut and the adjustable element. Either the spindle translate along a drive axis, extending in an axial direction, to move the adjustable element between an open position and a closed position, a planetary gear assembly operatively coupled to and disposed between the spindle nut and the motor, the planetary gear assembly including, a sun wheel, a planet carrier, a gear carried by the planet carrier, an (Continued)

annulus connected to the housing and arranged coaxially to the sun wheel, and a first frictional element non-rotatably fixed with respect to the housing and connected to either the planet gear or the planet carrier. The first frictional element brakes movement of the spindle or the spindle nut.

14 Claims, 3 Drawing Sheets

(56) References Cited

FOREIGN PATENT DOCUMENTS

| | | | | | |
|---|---|---|---|---|---|
| DE | 202007015597 | U1 | | 3/2009 | |
| DE | 202011106149 | U1 | | 1/2013 | |
| DE | 102016207415 | A1 | | 10/2016 | |
| DE | 202017102066 | U1 | | 8/2018 | |
| DE | 102017113092 | A1 | | 12/2018 | |
| EP | 2284345 | A1 | | 2/2011 | |
| KR | 20180082538 | A | | 7/2018 | |
| WO | WO-2013045104 | A1 | * | 4/2013 | ............ E05F 15/622 |

OTHER PUBLICATIONS

Korean Office Action for 10-2021-7029301, Google Enlgish Machine Translation attached to original, Dated Sep. 25, 2023, All together 10 Pages.

* cited by examiner

SPINDLE DRIVE FOR THE MOTOR ADJUSTMENT OF AN ADJUSTMENT ELEMENT OF A MOTOR VEHICLE

CROSS-REFERENCE TO RELATED APPLICATIONS

This application is the U.S. National Phase of PCT Application No. PCT/EP2020/053695 filed on Feb. 13, 2020, which claims priority to German Patent Application No. DE 10 2019 103 682.8, filed on Feb. 13, 2019, the disclosures of which are hereby incorporated in their entirety by reference herein.

TECHNICAL FIELD

The present disclosure relates to a spindle drive for motor-driven adjustment of an adjustable element for use in a motor vehicle.

BACKGROUND

A spindle drive may be used for all possible adjustable elements of a motor vehicle. Examples thereof include a tailgate, a trunk lid, a door, such as a side door, an engine hood or the like, of a motor vehicle.

SUMMARY

According to one or more embodiments, the spindle drive may include a braking arrangement configured to brake a rotational movement of the drive-side mechanism component of the spindle-spindle nut mechanism, such as of the spindle, in such a way that a part of the braking arrangement, such as an axial section of the braking arrangement, is integrated into the speed reduction gear, such as, into a planetary gear of the speed reduction gear. The braking arrangement is thus not a unit which is separate from the speed reduction gear and may include frictional engagement elements that are separate and spaced apart axially from the speed reduction gear and may be in frictional engagement in order to produce the braking action. On the contrary, at least one of the frictional engagement elements of the braking arrangement may be provided on a planet carrier. At least one other frictional engagement element, which is in frictional engagement therewith, is provided on the housing side, that is to say is rotationally fixed with respect to the drive housing.

In the case where only one planetary gear and correspondingly only one planet carrier is provided, the planet carrier with the respective at least one frictional engagement element is that planet carrier which is coupled to the spindle-spindle nut mechanism.

According to the proposal, however, it is also possible for the planetary gear assembly to have a plurality of, such as two, planetary gears, in which case one of the two planet carriers, such as the planet carrier on the feed mechanism side, that may be at the rear in terms of drive, is the one with the at least one frictional engagement element. In principle, it is also possible to provide more than one planet carrier with at least one corresponding frictional engagement element, which, as part of the braking arrangement, is in frictional engagement with at least one frictional engagement element on the housing side. With the braking arrangement provided according to the proposal, at least one planetary gear of the speed reduction gear, possibly also a plurality of planetary gears, is or are braked directly, as a result of which, ultimately, the rotational movement of the drive-side mechanism component of the spindle-spindle nut mechanism, in particular the spindle, is braked. Since, in the solution according to the invention, the braking arrangement does not form a unit separate from the speed reduction gear or from the feed mechanism, but is at least partially integrated into the speed reduction gear, the technical length of the spindle drive and thus correspondingly also the installation space in the motor vehicle can be significantly reduced.

More specifically, it is now proposed that the braking arrangement may include at least one first frictional engagement element, which is fixed in terms of rotation relative to the drive housing, and at least one second frictional engagement element, which is in frictional engagement with the respective first frictional engagement element and is connected to the planet carrier or one of the planet carriers for conjoint rotation therewith. In this case, the braking arrangement brakes at least one planet carrier and a plurality or all of the planet carriers of the planetary gear assembly, more specifically directly, i.e. by direct frictional contact between at least one frictional engagement element on the planet carrier side and at least one frictional engagement element on the housing side. In this case, the braking action is particularly preferably a continuous braking action.

The frictional engagement elements may be in frictional engagement with one another in the axial direction, with the result that the planet carrier, in particular the planet carrier which transmits the torque to the drive-side mechanism component of the spindle-spindle nut mechanism, is braked axially (claim 2). In addition or as an alternative, however, it is also possible to provide radially frictional engagement (claim 3).

According to one or more embodiments, the planetary gear assembly may include exactly one planetary gear. In this case, the only planet carrier is the one which transmits the torque to the drive-side mechanism component. This planet carrier is at the same time that planet carrier which may include the at least one frictional engagement element interacting frictionally with the at least one housing-side frictional engagement element. Alternatively, the planetary gear assembly can also have a plurality of planetary gears and, correspondingly, a plurality of planet carriers, wherein one of the planetary gears is connected downstream of the other of the planetary gears in terms of drive. The planetary gear which is connected downstream in terms of drive is then that planetary gear which or the planet carrier of which is coupled to the spindle-spindle nut mechanism.

As an example, the drive connection of two planetary gears of the planetary gear assembly may be connected in series.

According to one or more embodiments, at least one third frictional engagement element may be provided on the planet carrier of the planetary gear at the front in terms of drive in the planetary gear assembly that may include a plurality of planetary gears. This at least one third frictional engagement element is likewise part of the braking arrangement.

As an example, a contact pressure force of the frictional engagement elements may move the frictional engagement elements toward one another. The contact pressure mechanism may be adjustable. The contact pressure mechanism may include a spring arrangement, such as at least one helical spring.

According to another embodiments, an adjustable element assembly of a motor vehicle having an adjustable element and a spindle drive as above according to the proposal is provided. To this extent, reference may be made to all statements regarding the spindle drive according to the proposal.

BRIEF DESCRIPTION OF THE DRAWINGS

The invention is explained in greater detail below with reference to a drawing, which illustrates only illustrative embodiments. In the drawing.

DETAILED DESCRIPTION

Figure 1:
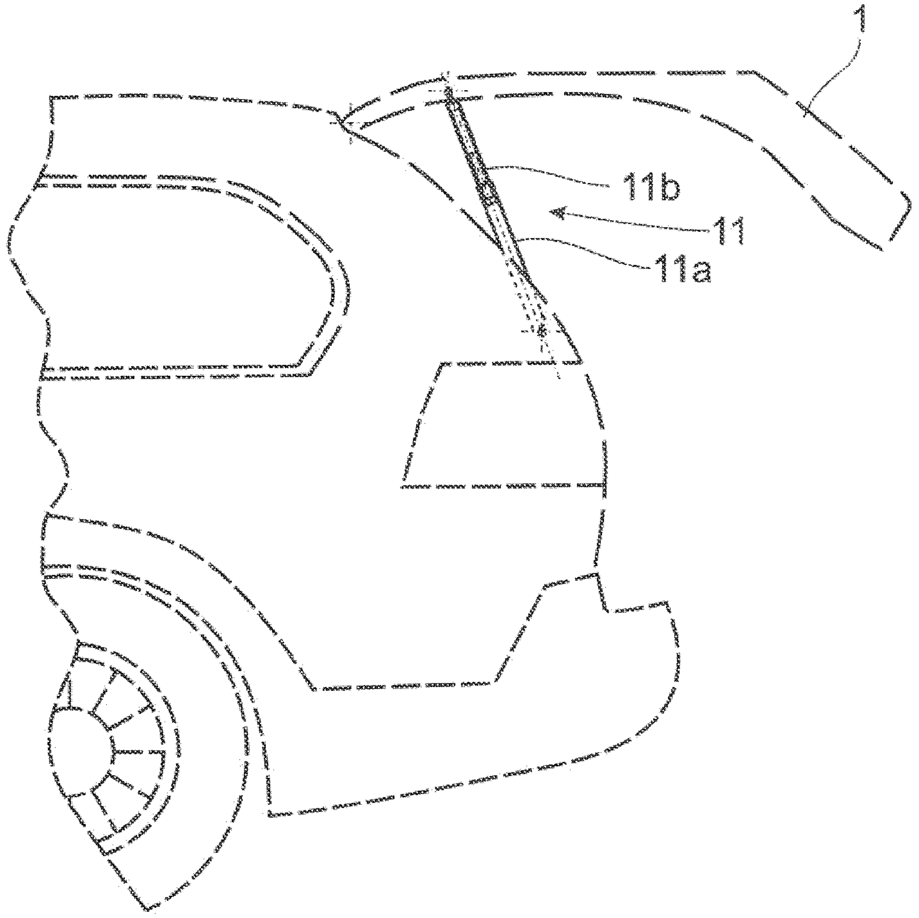
FIG. 1 shows a highly schematic illustration of the tailgate area of a motor vehicle with a spindle drive according to the proposal.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

A known spindle drive is disclosed in DE 20 2017 102 066 U1, is equipped with a rotary drive motor, a speed reduction gear connected downstream of the drive motor, and a feed mechanism connected downstream of the speed reduction gear. The speed reduction gear of the known spindle drive is designed as a planetary gear assembly with a planetary gear which, as the usual planetary gear components, has a sun wheel, an annulus and a planet carrier with planets. In order to produce linear drive movements in an axial direction, the feed mechanism is designed as a spindle-spindle nut mechanism which has a spindle on the drive side and a spindle nut on the output side as the usual mechanism components.

The known spindle drive may be advantageous since it permits reliable holding of the adjustable element in the open position or in intermediate positions. For this purpose, a braking arrangement which brakes the rotational movement of the drive spindle is provided in the drive train of the spindle drive. In this case, the braking arrangement is designed as a separate unit which has frictional engagement elements that are in frictional engagement with one another and provide the braking action by means of the frictional engagement produced. In this case, the unit comprising the braking arrangement is connected in terms of drive between the planetary gear of the planetary gear assembly and the spindle-spindle nut mechanism. In this case, the planetary gear has an output element on the output side, which interacts with a drive element of the braking arrangement in terms of drive, that is to say in a torque-transmitting manner. In turn, the braking arrangement itself has an output-side output element, which interacts with a drive element of the spindle-spindle nut mechanism, in this case the spindle. All the aforementioned drive components of the spindle drive, namely the drive, speed reduction gear, braking arrangement and feed mechanism, are accommodated one behind the other in an elongate, telescopic drive housing and are aligned with a common drive axis, the direction of extent of which is referred to below as the axial direction. The drive housing has a correspondingly large technical length and accordingly takes up a relatively large amount of installation space in the motor vehicle.

The problem underlying the invention is that of configuring and developing the known spindle drive in such a way that its technical length and thus the installation space required in the motor vehicle are reduced.

The spindle drive illustrated in the drawing serves for the motor-driven adjustment of an adjustable element 1 of a motor vehicle designed as a tailgate. This is to be understood to be advantageous, but not restrictive. On the contrary, the spindle drive according to the proposal can be used for all possible adjustable elements of a motor vehicle, as will be explained further below.

The spindle drive is equipped with a drive motor 2, a speed reduction gear 3 connected downstream of the drive motor 2, and a feed mechanism 4, connected downstream of the speed reduction gear, for generating linear drive movements. The speed reduction gear 3 is designed as a planetary gear assembly with at least one planetary gear 3*a*, 3*b*. According to FIG. 3*a*), the planetary gear assembly has a single planetary gear 3*a*, whereas the planetary gear assembly according to FIG. 3*b*) has two planetary gears 3*a*, 3*b* connected in series in terms of drive. In order to produce the linear drive movements, the feed mechanism 4 connected downstream of the planetary gear assembly in terms of drive, is configured as a spindle-spindle nut mechanism.

The respective planetary gear 3*a*, 3*b* may include a sun wheel 5, a planet carrier 6 with planets 6*a*, and an annulus 7 as planetary gear components. The sun wheel 5 is rotatable about a corresponding sun wheel axis. Coaxially therewith, the planet carrier 6 is rotatable about a planet carrier axis, wherein the planets 6*a* are each rotatable on the planet carrier 6 about their own planet axes. The annulus 7 is also rotatable coaxially with the sun wheel 5 on an annulus axis, wherein the annulus 7 may be fixed with respect to the housing, that is to say permanently fixed rotationally and axially. It is also conceivable that the annulus 7 is lockable, enabling it to be locked or to be freely rotatable about its annulus axis, depending on the state. In the latter case, the respective planetary gear 3*a*, 3*b* can be used as a shiftable clutch. The planets 6*a* are in axially parallel engagement with the sun wheel 5, on the one hand, and with the annulus 7, on the other hand. Here, the term "axially parallel" means that the sun wheel axis, the planet axes and the annulus axis are aligned parallel to one another.

Figure 2:
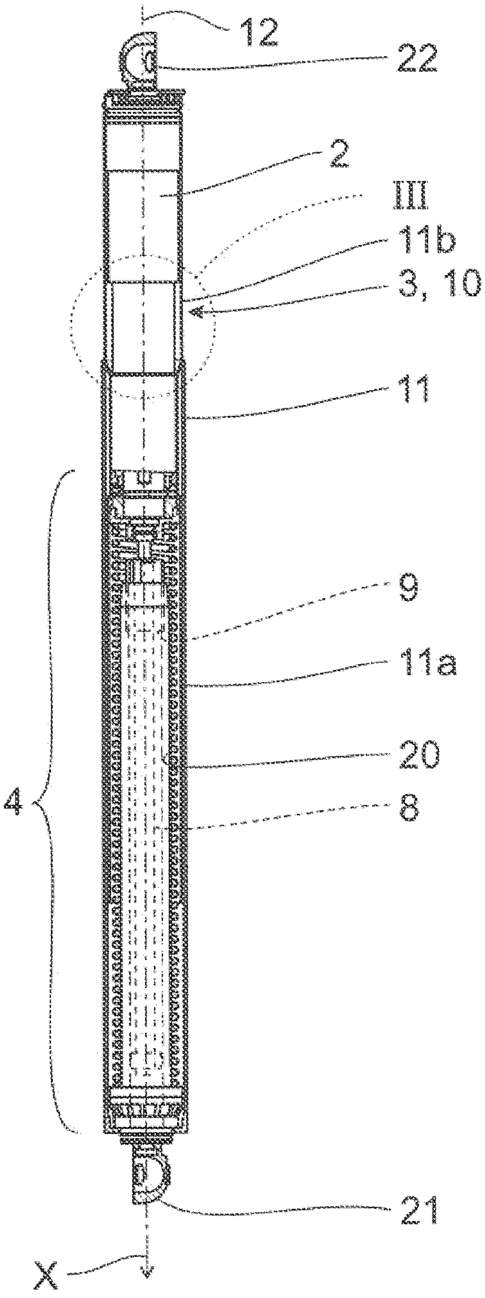
FIG. 2 shows the spindle drive according to FIG. 1 in the retracted state in a partially sectioned side view.

The feed mechanism 4, which is designed as a spindle-spindle nut mechanism, has a drive-side mechanism component and an output-side mechanism component in meshing engagement therewith (FIG. 2). "Drive side" means the side in the drive train of the spindle drive on which the torque is generated, i.e. the motor side. The drive-side mechanism component is thus the mechanism component which receives the rotary motion generated by the drive motor 2 and transmitted by the speed reduction gear 3 and transmits it to the output-side mechanism component. As an example, the drive-side mechanism component is a spindle 8 and the output-side mechanism component is a spindle nut 9 in meshing engagement therewith. Alternatively, it is also possible to conceive of an embodiment in which the drive motor 2 drives the spindle nut 9 instead of the spindle 8 via the speed reduction gear 3, the spindle nut 9 then forming the drive-side mechanism component and the spindle 8 forming the output-side mechanism component.

As an example, the torque generated by the drive motor 2 is permanently transmitted to the spindle 8 via the planet carrier 6 coupled to the feed mechanism 4. "Coupled" means that the two respective elements, in this case planet carrier 6 and spindle 8, are in engagement with one another in terms of drive, that is to say in a torque-transmitting manner. Alternatively, it is also possible to conceive of an embodiment in which the torque generated by the drive motor 2 is transmitted to the spindle 8 either via the annulus 7 or via the planet carrier 6, depending on the gear position of the respective planetary gear 3*a*, 3*b*.

Furthermore, a braking arrangement 10 is provided which brakes the rotary motion of the spindle 8 and permits reliable holding of the adjustable element 1, for example a tailgate, in intermediate positions.

A particularly slim design may result from the fact that the drive motor 2, the speed reduction gear 3 and the feed mechanism 4 are accommodated one behind the other in a substantially elongate drive housing 11 and are aligned with a common drive axis 12.

As an example, it is possible with the respective planetary gear 3*a*, 3*b* to form a non-self-locking configuration of the speed reduction gear 3. For this purpose, the respective planetary gear 3*a*, 3*b* can be configured as a gear with helical teeth, for example. The planetary gear 3*a*, 3*b* can, for example, also be configured as an evoloid gear, the sun wheel 5 of which has only a single pinion tooth, which has an involute profile running in a spiral around the sun wheel axis. The planets 6*a* and the annulus 7 then have corresponding teeth. Reference may be made to DE 20 2011 106 149 U1 for the technical details of such evoloid toothing. It may be provided that the speed reduction gear 3, or even the entire drive train that may include the drive motor 2, speed reduction gear 3 and feed mechanism 4, is of a non-self-locking configuration. This is may be advantageous when the spindle drive is used as a tailgate drive, making manual adjustment of the tailgate 1 readily possible when the drive motor 2 is not being supplied with power.

In the spindle drive according to the proposal, as already indicated above, a torque is now transmitted from the single planetary gear 3*a* (FIG. 3*a*)) or the planetary gear 3*b* (FIG. 3*b*)) which, in terms of drive, is at the rear of the planetary gear assembly to the downstream feed mechanism 4, more specifically inasmuch as the planet carrier 6 of the planetary gear 3*a* or planetary gear 3*b* coupled to the feed mechanism 4 is connected to an output element 13 for conjoint rotation therewith. Here and for preference, the output element 13 is configured as an output claw and transmits the torque, such as, to a spindle connection, which can be configured as a corresponding drive claw and which is connected to the spindle 8 for conjoint rotation therewith. On the drive side, the planetary gear assembly has a drive element 14, which is provided for transmitting a drive-side torque, that is to say a torque of the drive motor 2, to the planet carrier 6 of the respective drive-side planetary gear 3*a*, and which is connected to the sun wheel 5 for conjoint rotation therewith. As an example, the drive element 14 may also configured as an output claw and transmits the torque, for example, to a connection of the motor shaft of the drive motor 2, which may be configured as a corresponding output claw.

The crucial point is now that the braking arrangement 10 has at least one first frictional engagement element 15*a*, 15*b*, which is fixed in terms of rotation relative to the drive housing 11, and at least one second frictional engagement element 16*a*, 16*b*, which is in frictional engagement with the respective first frictional engagement element 15*a*, 15*b* and is connected to the planet carrier or one of the planet carriers 6 for conjoint rotation therewith. As an example, the braking arrangement 10 is designed for continuous braking of the respective planet carrier 6. An additional braking arrangement 10 to the one described here and may not be provided in the drive train of the spindle drive. The braking arrangement 10 is thus preferably the only braking arrangement of the spindle drive.

FIGS. 3*a*) and 3*b*) show two different exemplary embodiments of a spindle drive according to the proposal having such a braking arrangement 10. In this case, the planetary gear assembly according to FIG. 3*a*) has only a single planetary gear 3*a*, whereas the planetary gear assembly according to the exemplary embodiment in FIG. 3*b*) has two planetary gears 3*a*, 3*b* connected in series.

In the following, the exemplary embodiment according to FIG. 3*a*) will first be explained in more detail.

As an example, the planet carrier 6, which here is the only planet carrier 6 of the planetary gear assembly, is provided on its two axial sides with a respective second frictional engagement element 16*a*, 16*b*, namely on the axial side facing the feed mechanism 4 with frictional engagement element 16*a* and on the axial side facing the drive motor 2 with frictional engagement element 16*b*. Each of the second frictional engagement elements 16*a*, 16*b* interacts frictionally with an associated first frictional engagement element 15*a*, 15*b*, each of which is fixed in terms of rotation relative to the drive housing 11. Here, frictional engagement element 16*a* of the planet carrier 6 interacts, in each case frictionally, with a frictional engagement element 15*a* on the housing side, and the other frictional engagement element 16*b* of the planet carrier 6 interacts with the other frictional engagement element 15*b* on the housing side. In one or more embodiments, the respective frictional resistance between frictional engagement elements 15*a* and 16*a*, on the one hand, and between frictional engagement elements 15*b* and 16*b*, on the other hand, is equal. In principle, however, it is also conceivable to provide frictional resistances of different magnitudes between the individual pairs of frictional engagement elements. Thus, it is conceivable to provide balls, rollers or the like in the case of one pair of frictional engagement elements, for example between frictional engagement elements 15*b* and 16*b*, thus ensuring that only rolling friction occurs here, whereas in the case of the other pair of frictional engagement elements static friction occurs when the spindle drive is stationary and sliding friction occurs during operation of the spindle drive. The rolling friction then causes, in particular, lower frictional resistance than the static or sliding friction.

In one or more embodiments, exactly one frictional engagement element 16*a*, 16*b* is provided on the planet carrier 6 on each axial side. In principle, however, it is also possible to provide more than one frictional engagement element 16*a*, 16*b* on one or the other axial side or on both axial sides of the planet carrier 6. The same applies to the frictional engagement elements 15*a*, 15*b* on the housing side, of which, here too, in each case only one is provided on the relevant axial side. In principle, however, it is also possible to provide more than one housing-side frictional engagement element 15_a_, 15_b_ on one or the other axial side or on both axial sides of the planet carrier 6.

Figure 3:
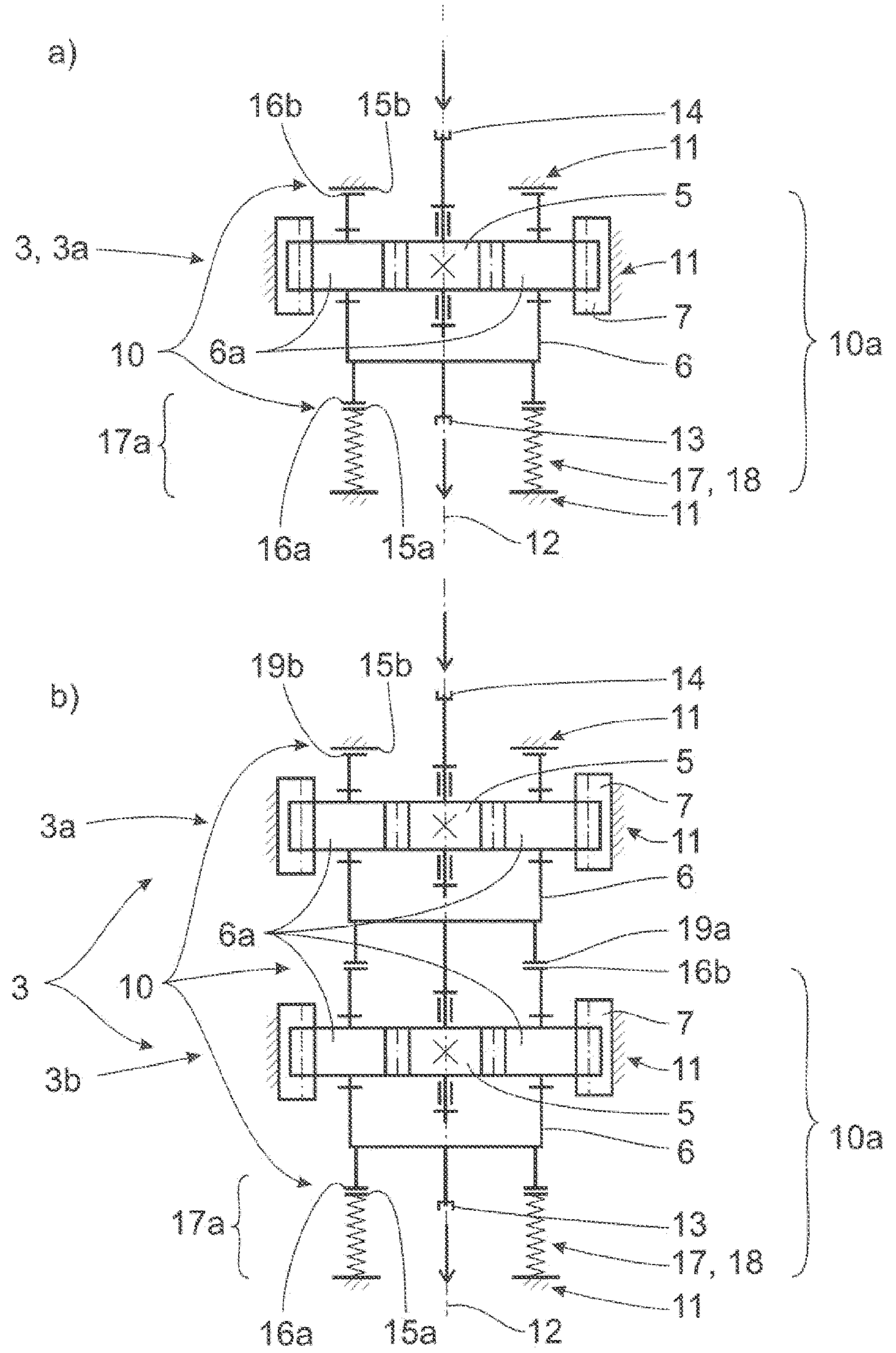
FIG. 3 shows a highly schematic representation of a train section of the drive train of the spindle drive shown in FIG. 1 a) according to a first exemplary embodiment and b) according to a second exemplary embodiment.

In principle, as illustrated in FIG. 3_a_) and FIG. 3_b_), it is conceivable for the respective first frictional engagement element 15_a_, 15_b_ or at least one of the first frictional engagement elements 15_a_, 15_b_ and the second frictional engagement element 16_a_, 16_b_ or at least one of the second frictional engagement elements 16_a_, 16_b_ to be in frictional engagement with one another in the axial direction X. In the exemplary embodiment in FIG. 3_a_), it is accordingly the case that the one first frictional engagement element 15_a_ is in frictional engagement with the one second frictional engagement element 16_a_ and the other first frictional engagement element 15_b_ is in frictional engagement with the other second frictional engagement element 16_b_ in each case in the axial direction X. As an example, therefore, the planet carrier 6 transmitting the torque to the drive-side mechanism component, here the spindle 8, is braked axially.

Alternatively, though not illustrated here, provision can also be made, however, for the first frictional engagement element 15_a_, 15_b_ or at least one of the first frictional engagement elements 15_a_, 15_b_ and the second frictional engagement element 16_a_, 16_b_ or at least one of the second frictional engagement elements 16_a_, 16_b_ to be in frictional engagement with one another radially. Thus, it is also conceivable here for the one first frictional engagement element 15_a_ and the one second frictional engagement element 16_a_ and/or the other first frictional engagement element 15_b_ and the other second frictional engagement element 16_b_ each to be in frictional engagement with one another radially. Frictional engagement elements 15_a_, 16_a_, on the one hand, and frictional engagement elements 15_b_, 16_b_, on the other hand, can be in frictional engagement with one another radially on the inside and/or radially on the outside of the planet carrier 6.

FIG. 3_b_) illustrates an exemplary embodiment with two planetary gears 3_a_, 3_b_. The two planetary gears 3_a_, 3_b_ are connected in series in terms of drive and in this case are, in particular, fixedly coupled to one another. “Fixed coupling” means that the drive connection cannot be released by means of a clutch. In principle, however, the two planetary gears 3_a_, 3_b_ can also be coupled to one another via a clutch.

In this case, one planetary gear 3_a_ is coupled to the drive side of the spindle drive, namely to the drive motor 2, whereas the other planetary gear 3_b_ is coupled to the spindle-spindle nut mechanism. As an example, the planetary gear 3_a_ coupled to the drive side is connected upstream of the planetary gear 3_b_ coupled to the spindle-spindle nut mechanism. Correspondingly, the planet carrier 6 transmitting the torque to the drive-side mechanism component, here the spindle 8, is the planet carrier 6 of the planetary gear 3_b_ at the rear in terms of drive. In this case, the sun wheel 5 of this planetary gear 3_b_ at the rear in terms of drive is coupled to the planet carrier 6 of the planetary gear 3_a_ which is connected upstream or at the front in terms of drive. In this case, the sun wheel 5 of planetary gear 3_b_ and the planet carrier 6 of planetary gear 3_a_ are arranged on a common shaft for conjoint rotation therewith.

It should be noted that, in the exemplary embodiment according to FIG. 3_b_), exactly two planetary gears 3_a_, 3_b_ are provided, which are connected in series. In principle, however, in an alternative embodiment not illustrated here, it is also possible to provide more than two planetary gears, which are connected in series. In this case, too, the planetary gear at the rear in terms of drive would be the planetary gear coupled to the spindle-spindle nut mechanism. At least two further planetary gears would then be connected in series upstream of the latter in terms of drive, and it would be possible for one of the planetary gears connected upstream in terms of drive to be coupled in the manner described to the planetary gear which is at the rear in terms of drive. At least one further planetary gear would in turn be connected upstream of the planetary gear which would be connected directly upstream of the planetary gear which is at the rear in terms of drive, which further gear would, in particular, be connected to the drive motor 2.

In the case described, in which the planetary gear assembly has a plurality of, in particular two, planetary gears 3_a_, 3_b_, the braking arrangement 10 preferably has at least one third frictional engagement element 19_a_, 19_b_, which is connected for conjoint rotation to the planet carrier 6 of that planetary gear 3_a_ which, in terms of drive, is connected upstream of the planetary gear 3_b_ coupled to the spindle-spindle nut mechanism. In this case, the at least one third frictional engagement element 19_a_, 19_b_ is in each case in frictional engagement with at least one of the further frictional engagement elements 15_a_, 15_b_, 16_a_, 16_b_.

In the exemplary embodiment in FIG. 3_b_), the braking arrangement 10 has a third frictional engagement element 19_a_, 19_b_ on each axial side of the planet carrier 6 of the planetary gear 3_a_ which is at the front in terms of drive, the third frictional engagement element being connected to the planet carrier 6 for conjoint rotation therewith. In this case, on the axial side of the planet carrier 6 of the planetary gear 3_a_ at the front in terms of drive, the side facing the feed mechanism 4, a third frictional engagement element 19_a_ of the planet carrier 6 interacts frictionally with a second frictional engagement element 16_b_ of the planet carrier 6 of the planetary gear 3_b_ at the rear in terms of drive. On the axial side of the planet carrier 6 of the planetary gear 3_a_ which faces the drive motor 2, a further third frictional engagement element 19_b_ of the planet carrier 6 interacts frictionally with a first frictional engagement element 15_b_ situated on the housing side. In the case of the planetary gear 3_b_ which is at the rear in terms of drive, a further second frictional engagement element 16_a_ of the planet carrier 6 of planetary gear 3_b_ interacts frictionally, on the axial side facing the feed mechanism 4, with a further first frictional engagement element 15_a_ situated on the housing side.

In a case with a planetary gear assembly which has a plurality of, in particular two, planetary gears 3_a_, 3_b_, as is illustrated by way of example in FIG. 3_b_), it is preferably the case that the frictional engagement elements interacting with one another frictionally in each case, or at least individual ones of the frictional engagement elements interacting with one another frictionally in each case, are in frictional engagement with one another in the axial direction. In one exemplary embodiment (shown in FIG. 3_b_), frictional engagement elements 15_a_ and 16_a_, frictional engagement elements 16_b_ and 19_a_ as well as frictional engagement elements 19_b_ and 15_b_ each interact with one another frictionally in the axial direction. Accordingly, it can be provided that the third frictional engagement element 19_a_ or at least one of the third frictional engagement elements 19_a_, 19_b_ and at least one of the second frictional engagement elements 16_a_, 16_b_ are in frictional engagement with one another in the axial direction X. Additionally or alternatively, it can be provided that the third frictional engagement element 19_b_ or at least one of the third frictional engagement elements 19_a_, 19_b_ and at least one of the first frictional engagement elements 15_a_, 15_b_ are in frictional engagement with one another in the axial direction X.

Additionally or alternatively, the first frictional engagement element 15_a_, 15_b_ or the second frictional engagement element 16*a*, 16*b*, each of which interacts frictionally with a third frictional engagement element 19*a*, 19*b*, may also be in frictional engagement radially with the third frictional engagement element 19*a*, 19*b*. Accordingly, it can be provided that the third frictional engagement element 19*a* or at least one of the third frictional engagement elements 19*a*, 19*b* and at least one of the second frictional engagement elements 16*a*, 16*b* are in frictional engagement with one another radially. Additionally or alternatively, it can also be provided that the third frictional engagement element 19*b* or at least one of the third frictional engagement elements 19*a*, 19*b* and at least one of the first frictional engagement elements 15*a*, 15*b* are in frictional engagement with one another radially.

As an example, the braking arrangement 10 has a contact pressure mechanism 17 for generating a contact pressure force, here an axial contact pressure force, of the frictional engagement elements toward one another. In the case of radial frictional engagement, as described above, between in each case two frictional engagement elements, it is also possible to provide a contact pressure mechanism which generates a corresponding radial contact pressure force of the frictional engagement elements toward one another. The contact pressure force of the frictional engagement elements is preferably adjustable.

In one or more embodiments, the contact pressure mechanism 17 may include a spring arrangement 18, the spring preload of which defines the contact pressure force. The spring preload and thus the contact pressure force may be adjustable. As an example, the spring arrangement 18 may include at least one helical spring, in particular a helical compression spring.

Achieving adjustability of the contact pressure force by means of a spring arrangement 18, the spring preload of which is adjustable, is not the only conceivable possibility. Additionally or alternatively, it is also conceivable for the contact pressure force to be adjustable via the adjustment of gear components with helical teeth or evoloid teeth in the respective planetary gear 3*a*, 3*b*.

As an example, it is further provided that the output element 13, which is connected for conjoint rotation to the planet carrier 6 which transmits the torque to the drive-side mechanism component, in particular the spindle 8, is arranged radially inside an axial section 10*a* of the braking arrangement 10 and/or radially inside an axial section 17*a* of the contact pressure mechanism 17. Additionally or alternatively, the drive element 14, which is provided for transmitting a drive-side torque to the planet carrier 6 of the respective drive-side planetary gear 3*a*, 3*b* and is connected to the sun wheel 5 for conjoint rotation therewith, can also be arranged radially inside an or the axial section 10*a* of the braking arrangement 10 and/or radially inside an or the axial section 17*a* of the contact pressure mechanism 17. In each case, this has the advantage that the technical length of the spindle drive can be further reduced.

Finally, the mode of operation of the feed mechanism 4 may be discussed in more detail. Operation of the drive motor 2 causes a speed-reduced rotation of the output element 13 of the speed reduction gear 3, which is transmitted to the spindle 8. Rotation of the spindle 8 causes a linear adjustment of the spindle nut 9 and thus a linear adjustment of a guide tube 20, which is fixedly connected to the spindle nut 9. The guide tube 20 is in turn connected in the region of a connection 21 of the spindle drive to a housing outer tube 11*a* of the drive housing 11, which can be telescoped with respect to a housing inner tube 11*b* of the drive housing 11. The housing inner tube 11*b* is, in turn, connected to an opposing connection 22. It furthermore accommodates the preferably preassembled unit comprising the drive motor 2, speed reduction gear 3 and braking arrangement 10. If appropriate, a clutch, not illustrated here, can also be provided in the drive train, and can likewise be a component of the preassembled unit. As an example, the spindle drive can be assembled as a variable modular system, depending on customer requirements.

According to another embodiment, an adjustable element assembly of a motor vehicle having an adjustable element 1 and a spindle drive above according to the proposal for motor-driven adjustment of the adjustable element 1 is provided. Reference may be made to all statements regarding the spindle drive according to the proposal which are suitable for explaining the adjustable element assembly.

As explained above, numerous variants are conceivable for the adjustable element 1. In a particularly preferred configuration, the adjustable element 1 is a tailgate, a trunk lid, a door, in particular a side door, an engine hood or the like, of a motor vehicle.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

The following is a list of reference numbers shown in the Figures. However, it should be understood that the use of these terms is for illustrative purposes only with respect to one embodiment. And, use of reference numbers correlating a certain term that is both illustrated in the Figures and present in the claims is not intended to limit the claims to only cover the illustrated embodiment.

LIST OF REFERENCE NUMBERS

1 adjustable element
2 drive motor
3 speed reduction gear
4 downstream feed mechanism
5 sun wheel
6 planet carrier
7 annulus
8 spindle
9 spindle nut
10 braking arrangement
11 drive housing
12 common drive axis

13 output element
14 drive element
17 contact pressure mechanism
18 spring arrangement
20 guide tube
21 connection
22 connection
**3*a*** planetary gear
**3*b*** planetary gears
**6*a*** planets
**10*a*** axial section
**11*a*** housing outer tube
**11*b*** housing inner tube
**15*a*** first frictional engagement elements
**15*b*** frictional engagement element
**16*a*** second frictional engagement element
**16*b*** second frictional engagement element
**17*a*** axial section
**19*a*** third frictional engagement elements
**19*b*** third frictional engagement elements

The invention claimed is:

1. A spindle drive configured to provide motor-driven adjustment of an adjustable element of a motor vehicle, the spindle drive comprising:

a drive motor;

a speed reduction gear connected to and downstream of the drive motor with respect to a drive movement; and a feed mechanism connected downstream of the speed reduction gear with respect to the drive movement, wherein the speed reduction gear is a planetary gear assembly provided with at least one planetary gear including a first planetary gear provided with a first rotatable sun wheel, a first rotatable planet carrier, arranged coaxially with the first rotatable sun wheel, and a first annulus, wherein the first rotatable planet carrier includes a first rotatable planet disposed axially parallel to and engaged with the first rotatable sun wheel and the first annulus, wherein the feed mechanism is a spindle-spindle nut mechanism configured to produce linear drive movements in an axial direction and includes a drive-side mechanism component formed by a spindle, and an output-side mechanism component, formed by a spindle nut in meshing engagement with the spindle, wherein a braking arrangement is provided, the braking arrangement is configured to brake a rotational movement of the drive-side mechanism component of the spindle-spindle nut mechanism, wherein an elongate drive housing is provided, wherein the drive motor, the speed reduction gear, and the feed mechanism are accommodated one behind the other and are aligned along a common drive axis extending in the axial direction, wherein, to generate transmission of a torque from the rotatable first planet carrier of the planetary gear which is in each case coupled to the spindle-spindle nut mechanism to the drive-side mechanism component of the spindle-spindle nut mechanism, an output element cooperating with the drive-side mechanism component is connected to the first rotatable planet carrier for conjoint rotation with the first rotatable planet carrier, and wherein the braking arrangement is provided with at least one first frictional engagement element, fixed in terms of rotation relative to the drive housing, and at least one second frictional engagement element in frictional engagement with the first frictional engagement element to hold the adjustable element in a fully open position, wherein the at least one second frictional engagement element is fixed in terms of rotation relative to the first planet carrier or to another planet carrier.

2. The spindle drive of claim 1, wherein the at least one first frictional engagement element and the at least one second frictional engagement element are configured to be in frictional engagement with one another in the axial direction.

3. The spindle drive of claim 1, wherein the planetary gear assembly is provided with only one planetary gear, wherein the one planetary gear is the first planetary gear.

4. The spindle drive of claim 1, wherein the planetary gear assembly includes a first planetary gear and a second planetary gear connected in series with respect to the drive movement and the first planetary gear is coupled to the spindle-spindle nut mechanism and is upstream with respect to the drive movement.

5. The spindle drive of claim 1, wherein the first rotatable sun wheel is coupled to the spindle-spindle nut mechanism and coupled to the rotatable first planet carrier or one of the at least one planetary gear connected upstream with respect to the drive movement.

6. The spindle drive of claim 1, wherein the output element is an output claw.

7. The spindle drive of claim 1, wherein the planetary gear assembly includes two planetary gears coupled to one another in series with respect to the drive movement and are coupled to the spindle-spindle nut mechanism.

8. The spindle drive of claim 1, wherein the braking arrangement includes at least one third frictional engagement element connected for conjoint rotation to the rotatable first planet carrier coupled to the spindle-spindle nut mechanism, wherein the at least one third frictional engagement element is in frictional engagement with at least one of the at least one first frictional engagement element and the at least one second frictional engagement element.

9. The spindle drive of claim 8, wherein the third frictional engagement element and the at least one of the second frictional engagement element are in frictional engagement with one another in the axial direction, and/or, the third frictional engagement element and the at least one of the first frictional engagement element are in frictional engagement with one another in the axial direction.

10. The spindle drive of claim 1, wherein the braking arrangement includes a contact pressure mechanism configured to generate a contact pressure force to urge the at least one first frictional engagement element and the at least one second frictional engagement element towards one another.

11. The spindle drive of claim 10, wherein the contact pressure mechanism is configured to be adjusted to adjust the contact pressure force.

12. The spindle drive of claim 10, wherein the contact pressure mechanism includes a spring arrangement configured to exert a spring preload and the contact pressure force is based on the spring preload.

13. The spindle drive of claim 12, wherein the output element is configured to transmit torque to the drive-side mechanism component.

14. The spindle drive of claim 12, further comprising:

a drive element, wherein the drive element is connected to the first rotatable sun wheel for conjoint rotation with the first rotatable sun wheel and the drive element is configured to transmit a drive-side torque to the first planetary gear, and wherein the drive element is arranged either radially inside an axial section of the braking arrangement or radially inside an axial section of the contact pressure mechanism.

* * * * *